United States Patent
Gringer et al.

(10) Patent No.: US 9,199,384 B2
(45) Date of Patent: Dec. 1, 2015

(54) RAZOR BLADE ASSEMBLY

(75) Inventors: Donald Gringer, New York, NY (US); Yuan Fang Cheng, Forest Hills, NY (US)

(73) Assignee: ALLWAY TOOLS, INC., Bronx, NY (US)

( * ) Notice: Subject to any disclaimer, the term of this patent is extended or adjusted under 35 U.S.C. 154(b) by 824 days.

(21) Appl. No.: 13/177,837

(22) Filed: Jul. 7, 2011

(65) Prior Publication Data

US 2013/0008036 A1 Jan. 10, 2013

(51) Int. Cl.
*B26B 21/58* (2006.01)
*B29L 31/00* (2006.01)
*B29C 45/14* (2006.01)
*B29K 705/00* (2006.01)

(52) U.S. Cl.
CPC ............ *B26B 21/58* (2013.01); *B29C 45/14426* (2013.01); *B29C 45/14311* (2013.01); *B29C 2045/14327* (2013.01); *B29K 2705/00* (2013.01); *B29L 2031/72* (2013.01)

(58) Field of Classification Search
CPC .................. B29C 39/10; B29K 105/06; B26B 21/54–21/60
USPC ......... 30/346, 346.5, 346.53, 346.58, 346.59, 30/346.6, 357; 15/256.5; 264/279
See application file for complete search history.

(56) References Cited

U.S. PATENT DOCUMENTS

| | | | | |
|---|---|---|---|---|
| 2,182,027 A * | 12/1939 | Little | .............................. | 33/492 |
| 2,582,913 A * | 1/1952 | Pfefferle | ..................... | 30/346.59 |
| 3,838,475 A * | 10/1974 | Quinlan et al. | ............. | 15/250.32 |
| 5,711,492 A * | 1/1998 | Cheladze | ....................... | 241/220 |
| 5,771,589 A * | 6/1998 | Kim | ........................... | 30/346.58 |
| 7,033,459 B2 * | 4/2006 | Rata et al. | ..................... | 162/281 |
| 2005/0126016 A1 * | 6/2005 | Branden | ..................... | 30/346.54 |
| 2007/0113366 A1 * | 5/2007 | Walworth et al. | .......... | 15/250.32 |
| 2008/0166234 A1 * | 7/2008 | Nishiyama et al. | ........ | 416/219 R |

* cited by examiner

*Primary Examiner* — Kenneth E. Peterson
*Assistant Examiner* — Samuel A Davies
(74) *Attorney, Agent, or Firm* — Gottlieb, Rackman & Reisman, P.C.

(57) ABSTRACT

There is provided in a preferred embodiment of the present invention a razor blade assembly having two plastic blades affixed to a central metal core. Each blade includes a blade edge and a connector for connecting to a connection slot in the metal core.

20 Claims, 2 Drawing Sheets

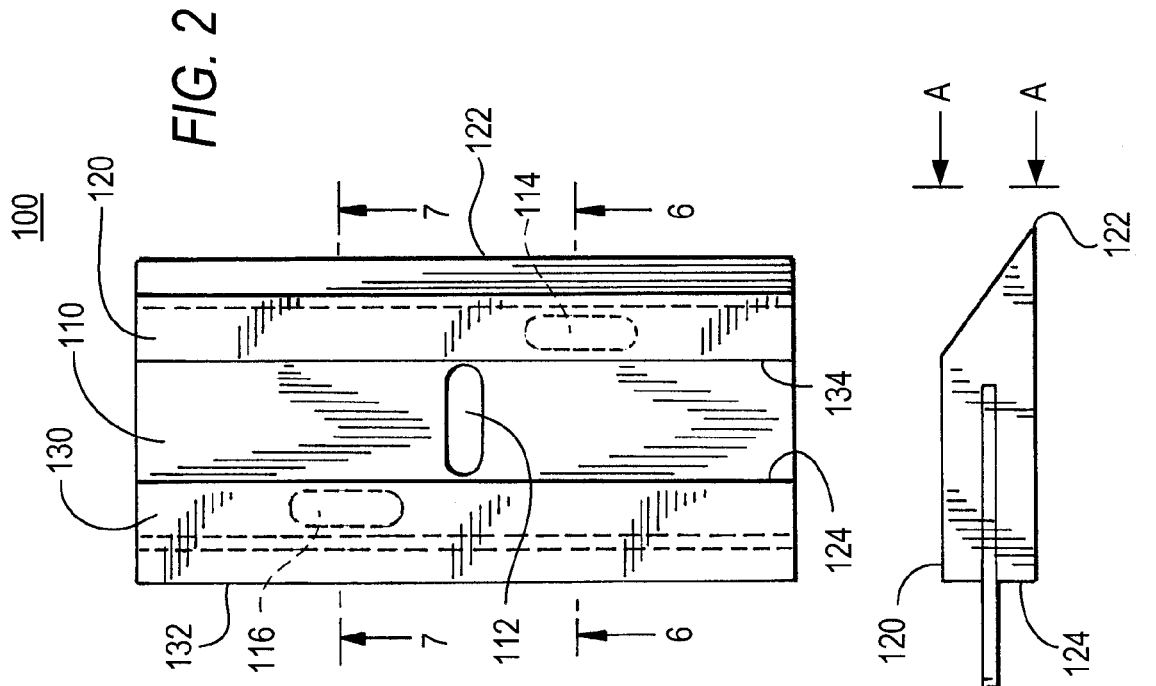
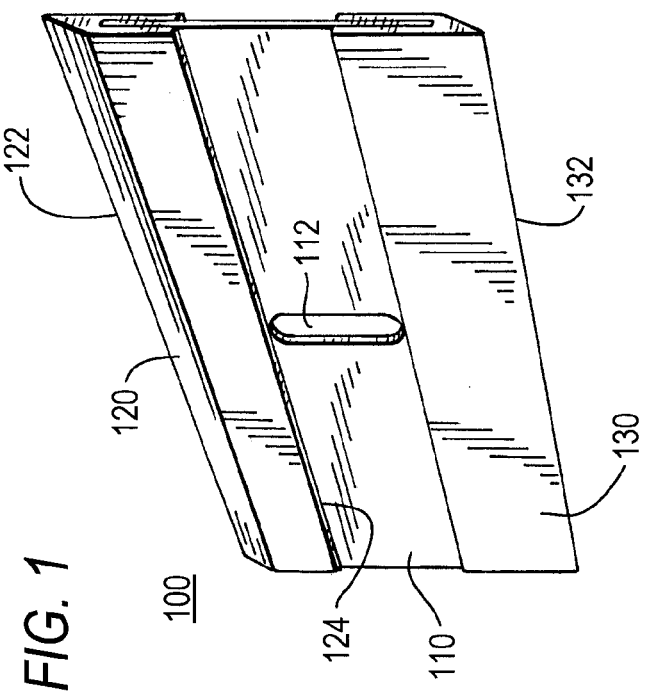

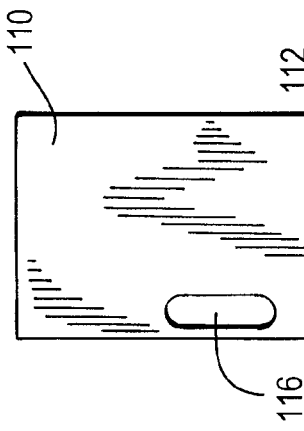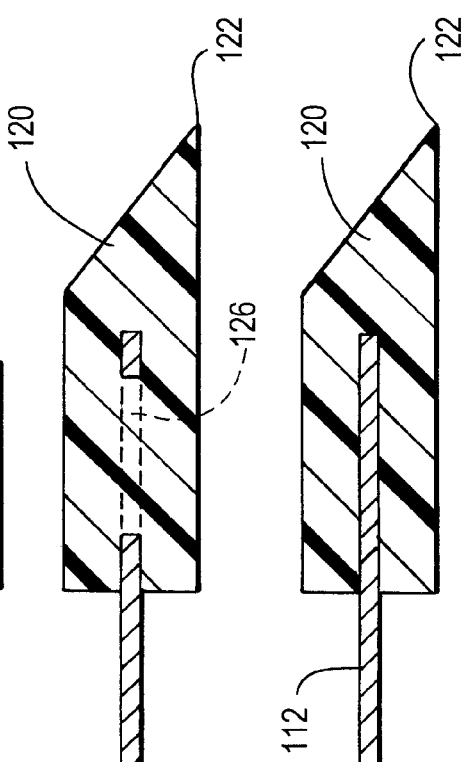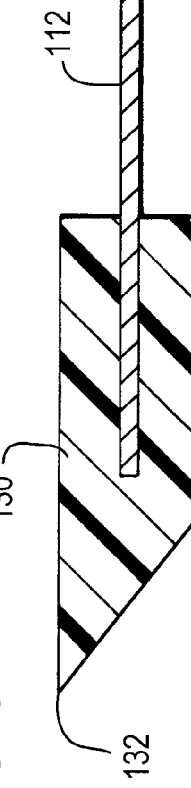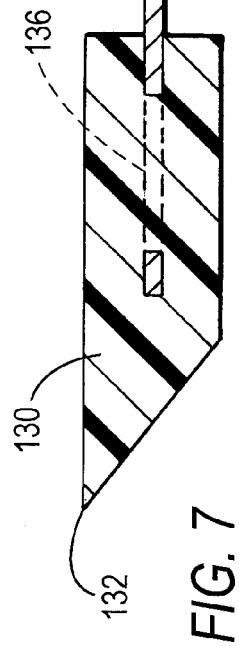
FIG. 4
FIG. 5
FIG. 6
FIG. 7

RAZOR BLADE ASSEMBLY

FIELD OF THE INVENTION

This invention relates generally to the field of razor blades. More specifically, this invention involves a razor blade assembly comprising an improved plastic razor blade that utilizes a metal core. In a preferred embodiment, the razor blade includes two plastic blades fixed to the metal core.

BACKGROUND OF THE INVENTION

Metal razor blades, including single edge industrial blades, have been in existence for many years. Generally, a metal razor blade consists of a metal blade edge, a metal back and a central slot. The central slot allows the razor blades to be held in a safety scraper or stacked together in a dispenser. Metal razor blades often have limited value because they are too sharp for many applications such as label scraping on painted surfaces or glass surfaces. Additionally, metal razor blades may chip during use, leaving behind a small piece of sharp hardened steel. For this reason, metal razor blades cannot be used in applications where a small piece of sharp steel would be problematic in field use or dangerous in field conditions, e.g. food preparation.

Because of the above limitations of metal razor blades, many field uses such as label removal and food preparation currently rely on all-plastic razor blades. The edge of the all-plastic blade is not as sharp or hard as a metal blade and does not dig into or damage a paint cured surface. The consequences of a plastic chip being left from an all-plastic blade are less likely and, if left behind, is much less severe compared to a sharp metal chip. Additionally, all-plastic razor blades have a much lower risk of cut injuries than steel razor blades.

Nevertheless, the all-plastic razor blades themselves are limited in use because they lack the strength and sharpness of metal razor blades. One particular problem of all-plastic razor blades is that they are more likely to bend during use. Once bent, the all-plastic razor blade no longer functions properly.

SUMMARY OF THE INVENTION

There is provided a razor blade assembly comprising a central, thin hardened metal core to which is affixed at least one and preferably a pair of plastic cutting edges. In view of the limitations of the prior art, it is an object of the present invention to provide a razor blade assembly that combines the benefits of plastic blades with the durability and stiffness of sharp all-metal razor blades.

Another object of the present invention is to provide an efficient and effective method of manufacturing a razor blade assembly having a plastic blade and a metal core.

A further objective of the present invention is to provide a razor blade assembly that secures a plastic blade to a metal core.

BRIEF DESCRIPTION OF THE DRAWINGS

The above-described and other advantages and features of the present disclosure will be appreciated and understood by those skilled in the art from the following detailed description and drawings of which, FIG. 1 is a perspective view of the razor blade assembly comprising a two sided plastic razor blade of the present invention;

FIG. 2 is a front view thereof, the back view being a mirror image of the front view;

FIG. 3 is a right side view thereof, the left view being a mirror image of the right view;

FIG. 4 is a top view of the metal core member of the razor blade assembly of the present invention;

FIG. 5 is a front view thereof;

FIG. 6 is a cross section view of the razor blade assembly comprising a two sided plastic razor blade of the present invention, taken along the line 6-6 of FIG. 1; and FIG. 7 is a further cross section view thereof, taken along the line 7-7 of FIG. 1.

DETAILED DESCRIPTION OF THE INVENTION

With reference to FIGS. 1 through 7, there is shown a razor blade assembly comprising a two sided plastic razor blade assembly 100 of the present invention. Assembly 100 includes a metal core 110, a first molded plastic blade 120 and a second molded plastic blade 130. The assembly 100 is preferably of the same size and dimensions as a conventional metal razor blade. The metal core 110 is thin, rectangular and elongated along the long axis of the assembly 100. Within the scope of the present invention, the assembly need have only a single plastic blade, but the double plastic blade is the preferred form.

The first plastic blade 120 extends across the length of the metal core 110. As shown in FIG. 3, the first plastic blade 120 includes a first sharp elongated plastic blade edge 122 and an elongated inward edge 124. The second plastic blade 130 is a mirror image of the first plastic blade 120 and includes a second sharp plastic blade edge 132 and a second inward edge 134. Plastic blades 120, 130 have a right-trapezoidal cross section shape where the inward edges 124, 134 are flat and perpendicular to the metal core 110. The plastic blade edges 122, 132 are formed at the outer side of the plastic blades 120, 130 where the edge has a right-triangular cross section shape, as shown in segment A—A. In the preferred embodiment, the plastic blade edges 122, 132 are positioned opposite each other relative to the height of the razor blade assembly 100, that is, as seen in FIGS. 3, 6 and 7, the edges 122 and 132, lie in separate but parallel planes. Further, the core 110 is positioned midway below the opposed, parallel edges of the plastic blades as shown in FIGS. 6 and 7.

As shown in FIGS. 1, 2 and 5, metal core 110 includes a central locking slot 112, which is somewhat oval in shape with its long axis being perpendicular to the long axis of plastic blade edges 122, 132. The central locking slot 112 is centrally located on the metal core 110 and locks in with other tools and handles to provide a larger gripping surface for the user.

FIGS. 4 and 5 show the metal core 110 separate from the plastic blades 120, 130. In order to construct the razor blade assembly 100, metal core 110 is first formed from a sheet of metal. The metal core 110 is preferably formed of 1075 high carbon or stainless steel that is heat treated to approximately 50 RC. Metal core 110 further includes opposed connection slots (i.e., a first opening and a second opening) 114, 116, which are used to securely connect the metal core 110 to the plastic blades 120, 130.

As illustrated most clearly in FIGS. 6 and 7, plastic blades 120, 130 each further include integrated connectors 126, 136 comprising a section of plastic blades 120, 130 which occupies the connection slots 114, 116. Since the connectors 126, 136 are an integral element of the plastic blades 120, 130, connectors 126, 136 secure plastic blades 120, 130 to the metal core 110. The use of a single connector 126, 136 for each plastic blade 120, 130 is preferred because the use of two connectors has been found to deform the plastic blade 120, 130 and even the metal core 110 when the liquid plastic shrinks during solidification.

During the manufacturing process, and in the injection molding step, the plastic is liquefied, as is conventional in molding processes, and metal core 110 is positioned relative to the liquefied plastic such that the liquefied plastic fills the connection slots 114, 116, forming respective plastic blade connectors 126, 136, as it forms plastic blades 120, 130. The plastic blades 120, 130 are preferably injection molded of a hard high quality plastic such as Celcon, Delrin, Lexan or Nylon, and may be compounded with glass for additional strength. Since the connection slots 114, 116 are of an elongated shape, the plastic blades 120, 130 are secured relative to the metal core 110 for a locking connection. The retention slots are shown elongated but can be of any various other shapes.

Accordingly, razor blade assembly 100 employs two plastic blades while maintaining superior strength due to the metal core 110. Razor blade assembly 100 is designed to be used for removing labels from painted surfaces and glass surfaces, where metal blades will cause scratching or injury, and in the field of food preparation, where metal blades pose a safety risk. Razor blade assembly 100 is an improvement over existing all-plastic blades because the inclusion of a metal core 110 give razor blade assembly 100 superior strength and durability that cannot be achieved in an all-plastic blade.

In alternative embodiments, razor blade assembly 100 may include only one plastic blade or may include a non-plastic, non-metal blade having similar properties to a plastic blade.

The accompanying drawings only illustrate one embodiment of a plastic razor blade and its respective constituent parts, however, other types and styles are possible, and the drawings are not intended to be limited in that regard. Thus, although the description above and accompanying drawings contains much specificity, the details provided should not be construed as limiting the scope of the embodiments but merely as providing illustrations of some of the presently preferred embodiments. The drawings and the description are not to be taken as restrictive on the scope of the embodiments and are understood as broad and general teachings in accordance with the present invention. While the present embodiments of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention.

The invention claimed is:

1. A method of manufacturing a surface scraper, comprising the steps of:
    providing a metal core including a first longitudinally extending edge and a second longitudinally extending edge spaced from the first longitudinally extending edge;
    forming a first connection slot adjacent to a first longitudinally extending edge and a second connection slot adjacent to a second longitudinally extending edge in the metal core;
    molding a first blade from a single piece of plastic that includes a first acute angled cutting edge, a first channel defined by a first sidewall and a second sidewall extending away from the first cutting edge with the first longitudinally extending edge of the metal core fixed within the first channel by only a first connector extending through the first connection slot between the first sidewall and the second sidewall of the first channel;
    molding a second blade from a single piece of plastic that includes a second acute angled cutting edge, a second channel defined by a first sidewall and a second sidewall extending away from the second cutting edge with the second longitudinally extending edge of the metal core fixed within the second channel by only a second connector extending through the second connection slot between the first sidewall and the second sidewall of the second channel; and
    wherein an exposed portion of the metal core extends between the first blade and the second blade.

2. The method of claim 1, wherein the first connection slot and the second connection slot are substantially ovoid.

3. A surface scraper, comprising:
    a metal core including a first longitudinally extending edge, a first opening adjacent to the first longitudinally extending edge, a second longitudinally extending edge and a second opening adjacent to the second longitudinally extending edge;
    a first blade formed from a single piece of plastic and including a first acute angled cutting edge, a first channel defined by a first sidewall and a second sidewall extending away from the first cutting edge and a first connector extending between the first sidewall and the second sidewall of the first channel; and
    a second blade formed of a single piece of plastic and including a second acute angled cutting edge, a second channel defined by a first sidewall and a second sidewall extending away from the second cutting edge and a second connector extending between the first sidewall and the second sidewall of the second channel,
    wherein the metal core is fixed within the first channel by only the first connector that extends through the first opening between the first sidewall and the second sidewall of the first channel and the metal core is fixed within the second channel by only the second connector that extends through the second opening between the first sidewall and the second sidewall of the second channel, and
    wherein an exposed portion of the metal core extends between the first blade and the second blade.

4. The surface scraper of claim 3, wherein the metal core is rectangular in shape, and the first plastic blade and second plastic blade are located on opposite sides of the metal core.

5. The surface scraper of claim 3, wherein the first plastic blade and the second plastic blade are mirror images of one another.

6. The surface scraper of claim 3, wherein the first plastic blade and the second plastic blade are opposed to one another and the metal core is located mid-way of the first plastic blade and second plastic blade.

7. The surface scraper of claim 3, wherein the first cutting edge lies in a first plane that extends between the first blade and the second blade and the second cutting edge lies in a second plane that is parallel to the first plane and that extends between the first blade and the second blade.

8. The surface scraper of claim 3, wherein the metal core is rectangular in shape, and the first cutting edge of the first plastic blade and the second cutting edge of the second plastic blade are trapezoidal in shape.

9. The surface scraper of claim 3, wherein the first opening and the second opening are substantially ovoid.

10. The surface scraper of claim 3, wherein the metal core includes only the first opening adjacent to the first longitudinally extending edge and the second opening adjacent to the second longitudinally extending edge.

11. The surface scraper of claim 3, wherein the first blade includes a first planar surface, a second planar surface and a linear surface extending at an angle directly between the first planar surface and the second planar surface of the first blade forming the first acute angled cutting edge.

12. The surface scraper of claim 11, wherein the first planar surface and the second planar surface of the first acute cutting edge are exterior surfaces.

13. The surface scraper of claim 3, wherein the second blade includes a first planar surface, a second planar surface and a linear surface extending at an angle directly between the first planar surface and the second planar surface of the second blade forming the second acute angled cutting edge.

14. The surface scraper of claim 13, wherein the first planar surface and the second planar surface of the second acute cutting edge are exterior surfaces.

15. A surface scraper, comprising:
a metal core including a first longitudinally extending edge with only a single first opening adjacent to the first longitudinally extending edge and a second longitudinally extending edge spaced from the first longitudinally extending edge with only a single second opening adjacent to the second longitudinally extending edge;
a first blade formed from a single piece of plastic and including a first acute angled cutting edge, a first channel defined by a first sidewall and a second sidewall extending away from the first cutting edge and a first connector extending between the first sidewall and the second sidewall of the first channel; and
a second blade formed of a single piece of plastic and including a second acute angled cutting edge, a second channel defined by a first sidewall and a second sidewall extending away from the second cutting edge and a second connector extending between the first sidewall and the second sidewall of the second channel,
wherein the metal core is fixed within the first channel by only the first connector that extends through the first opening between the first sidewall and the second sidewall of the first channel and the metal core is fixed within the second channel by the second connector that extends through the second opening between the first sidewall and the second sidewall of the second channel
wherein an exposed portion of the metal core extends between the first blade and the second blade.

16. The surface scraper of claim 15, wherein the first plastic blade and the second plastic blade are mirror images of one another.

17. The surface scraper of claim 15, wherein the first plastic blade and the second plastic blade are opposed to one another and the metal core is located mid-way of the first plastic blade and second plastic blade.

18. The surface scraper of claim 15, wherein the first cutting edge lies in a first plane that extends between the first blade and the second blade and the second cutting edge lies in a second plane that is parallel to the first plane and that extends between the first blade and the second blade.

19. The surface scraper of claim 15, wherein the first opening and the second opening are substantially ovoid.

20. The surface scraper of claim 15, wherein the metal core is fixed within the first channel by only the first connector and the metal core is fixed within the second channel by only the second connector.

* * * * *